April 22, 1969     R. C. MILLER ET AL     3,439,648
INDICATING DEVICE

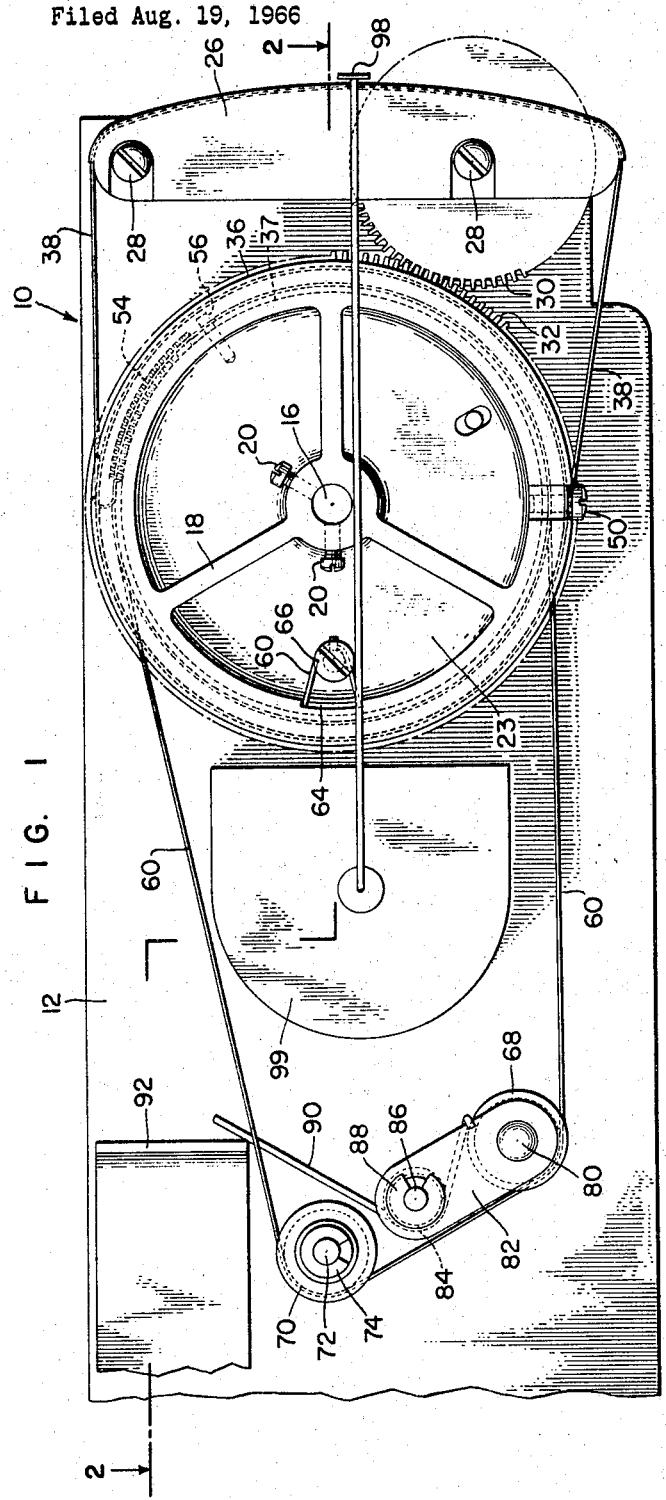
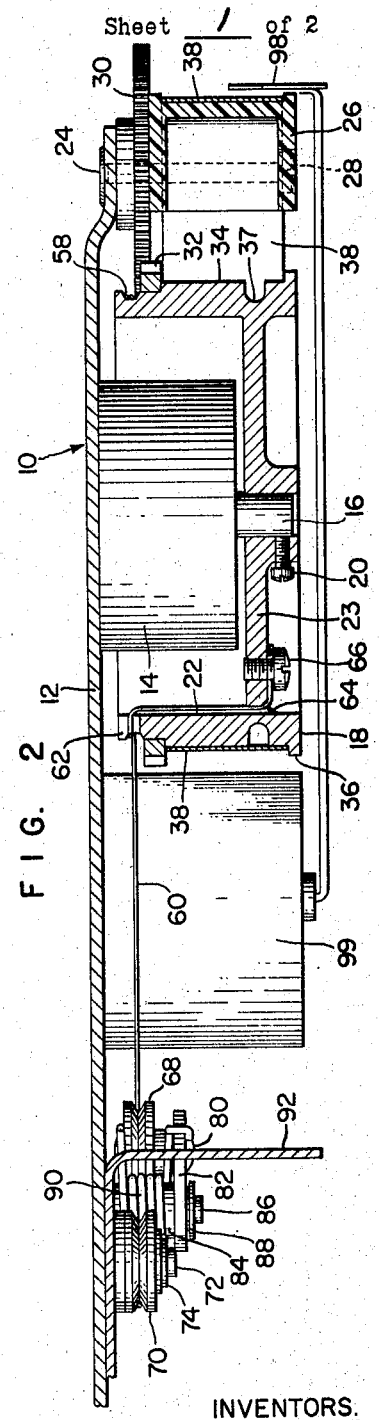
INVENTORS.
RONALD C. MILLER
WILLIAM F. NEWBOLD
ATTORNEY.

Filed Aug. 19, 1966

INVENTORS.
RONALD C. MILLER
WILLIAM F. NEWBOLD
BY *M. Michael Carpenter*

ATTORNEY.

United States Patent Office 3,439,648
Patented Apr. 22, 1969

---

3,439,648
INDICATING DEVICE
Ronald C. Miller, Norristown, and William F. Newbold, Springfield Township, Montgomery County, Pa., assignors to Honeywell Inc., Minneapolis, Minn., a corporation of Delaware
Filed Aug. 19, 1966, Ser. No. 573,514
Int. Cl. G09f 9/00
U.S. Cl. 116—135      7 Claims

ABSTRACT OF THE DISCLOSURE

An indicating device is shown with a single support drum upon which an indicating tape having indicia inscribed upon the surface thereof is mounted. The ends of the tape are relieved along opposite edges to form end portions having a width one half that of the central tape portion. The ends are wrapped about the outer surface of the support drum and attached thereto. A platen supports the central tape portion and provides for the display of the indicia upon the indicating tape. The drum is thus capable of rotating 360° for imparting linear motion of the indicating tape.

---

The present invention relates to an indicating device and, more particularly, to an indicator which utilizes a tape with indicia thereon for presenting a linear representation of a monitored signal.

In prior art devices it has been common to place an indicating tape between a pair of supporting rollers which act as take-up and supply means for the tape linearly stretched therebetween. Other devices have utilized a single continuous tape which is wrapped around a set of rollers and shuttled back and forth across them. These prior art devices all require an excessive amount of space and components in order to provide a linear scale that is large enough to be suitably legible.

It is, therefore, an object of the present invention to provide a legible linear indicating device which is compact and requires a minimum number of mechanical components.

Another object of the instant invention is to provide a legible linear indicating device which may be rapidly scanned for an instantaneous indication of an error or deviation occurring in a monitored signal.

Still another object of this invention is to provide a legible linear indicating device which is capable of indicating more than one monitored signal in a single indicator window wherein the plurality of monitored signals may be scanned for an instantaneous indication of error or deviation.

Yet another object of the instant invention is to provide a legible linear indicating device which is capable of providing an indication of an error or deviation of a monitored input signal from a previously determined setting of the indicating device.

A further object of the present invention is to provide a means for adjusting the predetermined setting of the indicating device which may be manipulated either manually or automatically.

A still further object of the present invention is to provide a legible linear indicating device having a predetermined setting and means for indicating an error or deviation of the monitored signal therefrom with a means for manually or automatically manipulating the predetermined setting wherein the manual manipulation is capable of overcoming the automatic manipulation.

Other objects and many of the attendant advantages of the present invention will become better understood by reference to the following detailed description when considered in connection with the accompanying drawings, wherein:

FIG. 1 is a side elevation view, showing the indicating device of the present invention and its manual and automatic manipulating means;

FIG. 2 is a horizontal section, taken generally along line 2—2 of FIG. 1;

Figure 3:
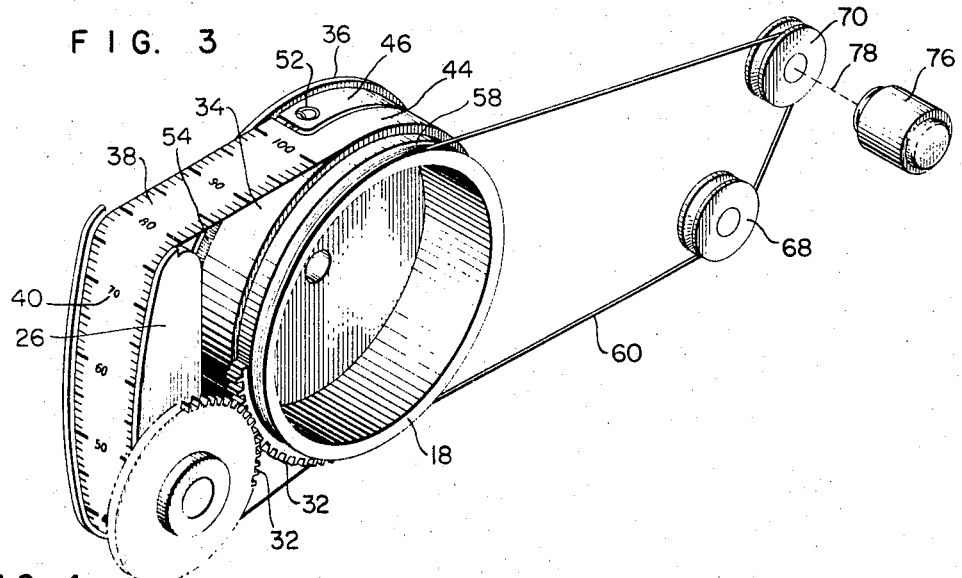
FIG. 3 is a perspective view, showing the linear indicating tape and supporting means of the indicating device.

The indicating device includes a single supporting drum upon which is mounted an indicating tape having indicia inscribed upon its surface. Each end of the indicating tape is relieved along an opposite edge thereof for forming ends having widths approximately one half that of the central portion. The narrow tape ends are wrapped about the outer surface of the supporting drum in juxtaposition to each other and attached thereto. A platen is provided adjacent to the supporting drum having flanges thereon for guiding the indicating tape along its surface. Due to this unique split tape arrangement the full 360° of drum surface may be utilized to support and impart linear motion to the indicating tape. A manual wheel is provided which engages the drum and transfers manually controlled motion to the indicating tape. Automatic manipulation is provided through a cable and pulley arrangement.

Referring now to the drawings, and more particularly to FIGS. 1 and 2, an indicating device is shown generally at 10 having a mounting frame 12 to which is attached a potentiometer 14. A single shaft 16 of the potentiometer extends outwardly away from the mounting frame 12 for rotatably mounting a supporting drum 18, attached thereto by set screws 20. The drum is internally relieved at 22 for forming a web portion 23. The relief allows the drum to fit over the potentiometer, thereby conserving space. A pair of internally threaded spacers 24 are attached to the forward end of the mounting frame 12, as by riveting, for supporting a platen member 26 in spaced relationship therefrom. The platen is secured to the mounting frame 12 by a pair of screws 28 passing therethrough and into the internally threaded portions of the spacers 24. The lower spacer 24 provides a mounting shaft for a manual wheel 30 which is rotatably secured thereon by the spaced relationship of the mounting plate 12 and platen 26. The outer periphery of the manual wheel 30 is provided with gear teeth for engaging a ring gear 32, attached to an outer supporting surface 34 of the supporting drum 18, as by a press fit. The gear teeth upon the manual wheel 30 also serve to provide a gripping surface for manual manipulation. The supporting surface 34 of the drum is outwardly enlarged for establishing a flange 36 while the ring gear 32 provides an oppositely arranged mating flange. The supporting surface is also inwardly relieved for forming a groove 37 between the flanges 32 and 36. An indicating tape 38 attaches, in a manner to be described hereinbelow between the flange 32 and 36 and passes around the platen 26 for forming a continuous loop.

Figure 4:
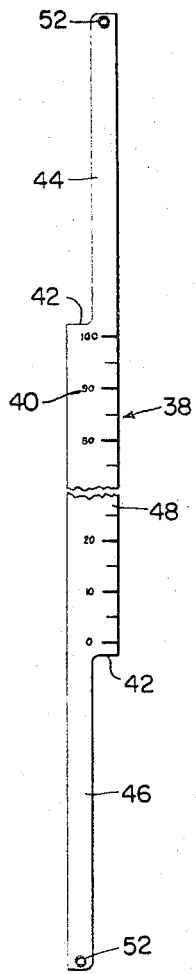
FIG. 4 is a plan view of the linear indicating tape.

As best seen in FIGS. 3 and 4, the tape 38 is provided with indicia, indicated at 40, open the outer surface thereof. It should be noted that the appearance and arrangement of the indicia upon the indicating tape, as shown herein, is illustrative and the present invention is not intended to be limited thereby. Each end of the indicating tape 38 is relieved at 42 along opposite longitudinal edges for respectively forming upper and lower end portions 44 and 46 and a central portion 48. End portions 44 and 46 are substantially one half as wide and one half as long as the central portion 48. The upper end portion 44 of the indicating tape 38 passes over the supporting surface 34 of the drum 18 and is wrapped 180° about the surface before it is secured thereto by a screw 50, FIG. 1. The screw 50 passes through an eyelet 52 positioned within the end of the end portion 44. For the purpose of the description herein, it shall be assumed that the longitudinal center of the center portion 48 is aligned with the longitudinal center of the platen 26. The lower end portion 46 passes under the drum 18 and is wrapped 180° around the supporting surface 34 where it is secured thereto by a spring 54 hooked through the eyelet 52. The spring 54 is recessed below the supporting surface 34 within the groove 37 and is secured therein by a pin 56.

The outer surface of the supporting drum 18 is further relieved between the ring gear 32 and the inner end thereof for forming a cable groove 58, FIG. 1, which receives a cable 60. Assuming the indicating tape 38 remains centered upon the platen 26, the cable 60 passes over the upper surface of the drum groove 58, wraps around the drum for three-quarters of a turn and threads through a first relief 62 in the bottom of groove 58 where it passes into the internally relieved portion 22 of the drum 18. The cable 60 then passes through an opening 64 in web 23 and is wound around a screw 66 threadably secured thereto. After being attached to the drum 18 by screw 66, the cable passes back through opening 64 and a second relief 62 where it is wrapped around the drum groove 58 toward the lower portion thereof for another three-quarters of a turn. The cable extends back from the drum 18 around an idler pulley 68 and over a driving pulley 70 before it returns to the upper surface of the drum groove 58.

The driving pulley 70 is rotatably retained upon a shaft 72 by a retaining ring 74, while the shaft 72 is attached to the mounting frame 12, as by riveting. Motion is imparted to the driving pulley 70 through a balancing motor 76, FIG. 3, and a suitable connecting arrangement, such as a gear train, indicated schematically by dashed line 78. The idler pulley 68 rotatably mounts upon a shaft 80 which attaches to an arm 82, as by riveting. A housing 84 is secured by riveting to the end of the arm 82 opposite from the idler pulley 68 and provides a pivotal support therefor, as the arm pivots about a shaft 86. The shaft 86 is mounted by riveting upon the mounting frame 12 and a retaining ring 88 secures the idler arm and housing subassembly thereto. A torsional spring 90 wraps about the housing 84 having one end formed in a hook for connection to the arm 82 and a second end formed with a straight portion which rests against a spring stop angle 92. The spring stop angle 92 may be adjustably attached to the mounting frame 12, by screws not shown. This arrangement allows the spring 90 to urge the idler pulley 68 against the cable 60 thereby providing the proper adjustable tension within the cable.

Figure 5:
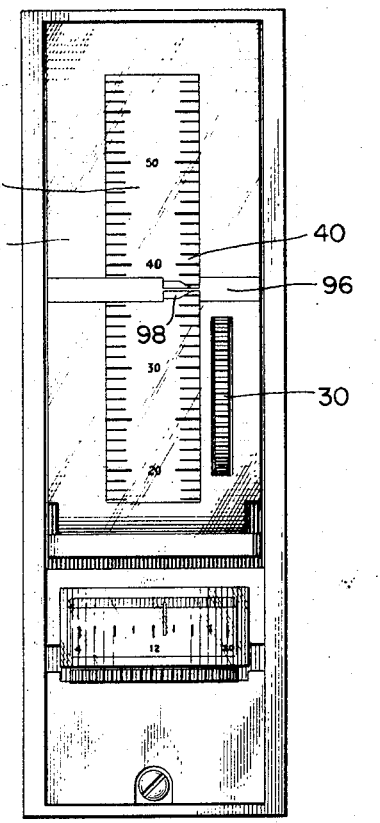
FIG. 5 is a front elevation view, illustrating the indicating device of the present invention mounted within a chassis and including more than one indicator within a single window.

FIG. 5 illustrates one embodiment of the indicating device wherein a predetermined setting may be monitored through a transparent window 94. Indicia, in the form of a suitable pointer 96, is inscribed upon the window 94 for providing an indication of the position of the indicating tape 38 relative to the pointer 96 and thus the value of the predetermined setting. A pointer 98 from a D'Arsonval galvanometer 99 is utilized to provide an indication of the deviation of the monitored signal from its predetermined setting. In this manner, the predetermined signal is indicated by the combination of the tape 38 and pointer 96 while the deviation of the monitored signal from its desired predetermined setting is indicated by the combination of the pointers 96 and 98. In the absence of a deviation between the monitored signal and the predetermined setting thereof the pointers 96 and 98 will be aligned, one behind the other, thereby allowing a rapid scanning of the indicating device to determine deviation. Obviously, other arrangements of the tape and window indicia are possible. For example, the indicia upon the tape 38 may be limited to the right side thereof with the pointer 96 displaced to the right upon the window 94. The pointer 98, from the galvanometer 99, could then be displaced to the left with complementary indicia inscribed upon the left side of the window 94. This arrangement allows one signal to be displayed by the position of the tape 38 relative to the pointer 96; a second signal to be displayed by the relative position of the pointer 98 with respect to the indicia upon window 94; and the relationship of the first signal with the second signal to be displayed by the comparative position of pointers 96 and 98.

In operation, the predetermined signal of the present embodiment is established by a voltage drop across the potentiometer 14 attached to the supporting drum 18. The drum 18, and thereby the potentiometer 14, may be displaced manually by the application of a rotational thumb pressure to the manual wheel 30, or automatically displaced by the rotational motion of the driving pulley 70, as provided by motor 76. Due to the unique arrangement of the present invention, the motion normally imparted to the indicating tape by the motor, in the automatic phase of operation, may be manually overcome by the application of thumb pressure to the manual wheel 30. This is caused by the proportionally small diameter of the driving pulley 70 compared to the diameter of the drum groove 58; the pressure of the idler pulley 68; and the arrangement of cable 60 upon the drum 18. As the drum 18 is rotated, by either manual wheel 30 or the drive pulley 70 and cable 60, the unique arrangement of the present invention allows the full 360° of the drum supporting surface 34 to be utilized. Assuming, as shown in FIG. 3, the indicating tape 38 is located in the center of the platen 26, the upper end portion 44 begins at the point of contact between tape and drum and wraps downwardly about the drum for 180° before it is attached thereto by screw 50. In a like manner, the lower end portion 46 begins at the tangency point of the tape and drum and wraps upwardly 180° where it is attached to the drum by spring 54 and pin 56. Through this unique arrangement the drum may be rotated 180° in each direction thereby providing for a total of 360° of usable drum surface. The indicating device thus described allows a single drum to be utilized for providing the supporting surface for the linear indicating tape. This arrangement reduces the number of components necessary to provide for a tape indicator and also reduces the size of the assembled device. At the same time, the unique arrangement of the present invention allows for a larger, more legible, scale upon the indicating tape.

Many modifications and variations of the present invention will become obvious to those skilled in the art, in light of the above teachings, and it should therefore be understood that the embodiment described hereinabove is an illustration rather than a limitation of the scope of the present invention. Consequently, the present invention should be limited only by the appended claims.

What is claimed is:

1. An indicating device comprising: a support means, indicating tape means having a longitudinal axis, said tape means having a central portion and opposite end portions, said central portion having indicia thereon, said end portions being laterally and oppositely offset about said longitudinal axis, drum means rotatably mounted on said support means, said end portions being wrapped and secured in juxtaposition on said drum means, platen means mounted on said support means adjacent said drum means and providing a supporting surface, said central portion of said tape means being supported on said supporting surface whereby the indicia on said central portion is displayed as said drum is rotationally displaced.

2. An indicating device as described in claim 1 wherein, said indicating tape means is relieved along opposite longitudinal edges thereof for forming said end portions substantially one half as wide as said central portion.

3. An indicating device as described in claim 2 wherein, said drum means includes a single drum, and each end portion of said indicating tape means wraps substantially one half way around said drum in offset juxtaposed relationship when said indicating tape means is symmetrically positioned thereon.

4. An indicating device as described in claim 1 additionally comprising, window means for viewing said linear displacement of said indicating tape means, and said window means having indicia inscribed thereon for providing an indication of the relative motion between said indicia thereon and said indicating tape indicia.

5. An indicating device as described in claim 4 comprising additionally, second indicating means including pointer means arranged in relation with said window indicia for providing an indication of relative motion between said window indicia and said pointer means associated with said second indicating means.

6. An indicating device as described in claim 1 additionally comprising, manual means connected to said rotatable drum means for imparting said rotational displacement thereto and thereby providing means for manually adjusting said indicating tape means.

7. An indicating device as described in claim 6 additionally comprising, cable means, driving means connected to said rotatable drum means by said cable means for imparting said rotational displacement thereto, and idler means arranged to allow said cable means to slip upon said driving means when said rotational displacement of said drum means is imparted thereto by said manual means.

References Cited

UNITED STATES PATENTS

| | | | |
|---|---|---|---|
| 1,187,558 | 6/1916 | Smith | 74—232 |
| 1,261,118 | 4/1918 | Geisel | 24—38 |
| 1,478,025 | 12/1923 | Cobaugh. | |
| 1,611,879 | 12/1926 | Bremer | 116—124.5 |
| 1,734,068 | 11/1929 | Ziola | 116—124.5 |
| 2,656,721 | 10/1953 | Melchior | 116—135 XR |
| 2,804,041 | 8/1957 | Neugass | 116—135 XR |
| 2,860,215 | 11/1958 | Williams | 338—196 |

FOREIGN PATENTS 1,114,899   10/1961   Germany.

LOUIS J. CAPOZI, *Primary Examiner.*

U.S. Cl. X.R.

116—124.1